United States Patent
Itai

(10) Patent No.: US 9,483,823 B2
(45) Date of Patent: Nov. 1, 2016

(54) MEDICAL IMAGE MEASUREMENT DEVICE AND METHOD, AND NON-TRANSITORY COMPUTER-READABLE RECORDING MEDIUM

(71) Applicant: FUJIFILM Corporation, Tokyo (JP)

(72) Inventor: Yoshinori Itai, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/746,131

(22) Filed: Jun. 22, 2015

(65) Prior Publication Data

US 2016/0012580 A1    Jan. 14, 2016

(30) Foreign Application Priority Data

Jul. 10, 2014  (JP) .................... 2014-142001

(51) Int. Cl.
 *G06K 9/00* (2006.01)
 *G06T 7/00* (2006.01)

(52) U.S. Cl.
 CPC ......... *G06T 7/0012* (2013.01); *G06T 2200/04* (2013.01); *G06T 2207/10081* (2013.01); *G06T 2207/10088* (2013.01); *G06T 2207/30096* (2013.01); *G06T 2210/41* (2013.01); *G06T 2211/40* (2013.01)

(58) Field of Classification Search
 CPC .......... A61B 1/00009; A61B 2576/00; A61B 2576/02; A61B 2576/023; A61B 2576/026; A61B 5/0033; A61B 5/1113; A61B 5/1116; A61B 5/112; A61B 5/1128; A61B 6/46; G01R 33/56366; G06F 19/10; G06F 19/30; G06K 2209/05; G06K 2209/051
 See application file for complete search history.

(56) References Cited

U.S. PATENT DOCUMENTS

| 2007/0092124 A1* | 4/2007 | Moriya ............ G06T 5/50 382/128 |
| 2008/0097186 A1* | 4/2008 | Biglieri ........... A61B 5/055 600/407 |
| 2009/0196470 A1* | 8/2009 | Carl ............... A61N 5/1049 382/128 |
| 2013/0279773 A1* | 10/2013 | Masumoto ......... G06T 5/40 382/128 |
| 2015/0002547 A1* | 1/2015 | Itai ............... A61B 6/463 345/634 |

FOREIGN PATENT DOCUMENTS

| JP | 2013-039427 A | 2/2013 |
| JP | 2013-111434 A | 6/2013 |
| JP | 2014-054476 A | 3/2014 |

* cited by examiner

Primary Examiner — Avinash Yentrapati
(74) Attorney, Agent, or Firm — Sughrue Mion, PLLC

(57) ABSTRACT

The medical image measurement device includes a medical image acquisition unit which acquires a first medical image and a second medical image obtained by photographing the same object of interest of the same patient at different time points, a measurement parameter acquisition unit which acquires a first measurement parameter set for measuring the features of the shape of the object of interest in the first medical image and a second measurement parameter set for measuring the features of the shape of the object of interest in the second medical image, an evaluation value acquisition unit which acquires an evaluation value indicating a change between the first measurement parameter and the second measurement parameter, and a determination unit which determines whether or not the change is equal to or greater than a preset amount of change based on the evaluation value.

19 Claims, 5 Drawing Sheets

MEDICAL IMAGE MEASUREMENT DEVICE AND METHOD, AND NON-TRANSITORY COMPUTER-READABLE RECORDING MEDIUM

CROSS-REFERENCE TO RELATED APPLICATIONS

The present application claims priority under 35 U.S.C. §119 to Japanese Patent Application No. 2014-142001, filed Jul. 10, 2014, all of which are hereby expressly incorporated by reference into the present application.

BACKGROUND OF THE INVENTION

1. Field of the Invention

The present invention relates to a medical image measurement device and method which measures features of a shape of an object of interest in a medical image, and a non-transitory computer-readable recording medium.

2. Description of the Related Art

In the related art, a predetermined feature quantity of an object of interest, such as a lesion, or a bone or an organ, included in a medical image, such as a radiation image, a magnetic resonance imaging (MRI) image, or an ultrasound image, is measured, and the growth of the lesion or the presence or absence of abnormality of the bone or the organ is confirmed based on the measurement result. For example, JP2014-54476A has suggested that bone mineral density is measured based on a radiation image obtained by photographing a bone. JP2013-39427A has suggested that the presence or absence of abnormality is determined by obtaining a change in the area of a small region of a lung using a radiation image obtained by photographing the lung. JP2013-111434A has suggested that the distance or the area between two points of a tumor or an area is measured using an ultrasound image.

For example, when confirming the growth of a lesion included in a medical image, it is considered to confirm the growth of the lesion by measuring the maximum diameter of the lesion included in a medical image photographed previously and the maximum diameter of the lesion included in a medical image photographed at this time and calculating a change in the length of the maximum diameter.

However, a lesion, such as a tumor, may grow while changing in shape from a state close to a circle to an ellipse. Specifically, as shown in FIG. 2, there is a case where the shape changes from a state close to a circle, like the lesion in the first medical image, to a state close to an ellipse extended in a predetermined direction, like the lesion in the second medical image.

Even in this case, as described above, when the maximum diameter (for example, a diameter specified by a point Pa1 and a point Pa2) of the lesion in the first medical image and the maximum diameter (for example, a diameter specified by a point Pb1 and a point Pb2) of the lesion in the second medical image are measured, and the amount of change is calculated, accurate growth of the tumor may not be measured. That is, the accurate growth may not be measured without consideration of a change over time of the tumor or the like. Here, although description will be provided regarding an example where a lesion is enlarged, the same applies to a case where a lesion is reduced.

SUMMARY OF THE INVENTION

The invention has been accomplished in consideration of the above-described situation, and an object of the invention is to provide a medical image measurement device and method capable of performing a medical image measurement in consideration of a change over time of an object of interest, such as a lesion, and a non-transitory computer-readable recording medium.

A medical image measurement device of the present invention includes a medical image acquisition unit which acquires a first medical image and a second medical image obtained by photographing the same object of interest of the same patient at different time points; a measurement parameter acquisition unit which acquires a first measurement parameter set for measuring the features of the shape of the object of interest in the first medical image and a second measurement parameter set for measuring the features of the shape of the object of interest in the second medical image; an evaluation value acquisition unit which acquires an evaluation value indicating a change between the first measurement parameter and the second measurement parameter; and a determination unit which determines whether or not the change is equal to or greater than a preset amount of change based on the evaluation value.

The medical image measurement device of the present invention further includes a measurement parameter resetting unit which, when the determination unit determines that the change is equal to or greater than a preset amount of change, resets one measurement parameter of the first measurement parameter and the second measurement parameter using the other measurement parameter to acquire a third measurement parameter; and a measurement unit which, using the third measurement parameter, measures the features of the shape of the object of interest in the first medical image or the second medical image with the one measurement parameter set.

The measurement parameter resetting unit may acquire the third measurement parameter based on a result of non-rigid registration of an image of the object of interest in the first medical image and an image of the object of interest in the second medical image and the other measurement parameter.

As the first measurement parameter, the second measurement parameter, and the third measurement parameter, information which specifies the diameter of the object of interest to be measured may be used.

As the first measurement parameter, the second measurement parameter, and the third measurement parameter, the coordinates of two points which are used to measure the distance between the two points in the object of interest may be used.

The measurement parameter resetting unit may acquire, as the third measurement parameter, the coordinate of an intersection point of a line connecting the coordinates of two points as the other measurement parameter and the contour of the object of interest in the first medical image or the second medical image with the one measurement parameter set.

The evaluation value acquisition unit may acquire the evaluation value based on the distance between a line connecting the coordinates of two points as the other measurement parameter and each of the coordinates of two points as the one measurement parameter.

The evaluation value acquisition unit may acquire, as the evaluation value, information on the angle between a line connecting the coordinates of two points as the first measurement parameter and a line connecting the coordinates of two points as the second measurement parameter.

As the first medical image and the second medical image, three-dimensional images may be acquired, and as the first measurement parameter, the second measurement parameter, and the third measurement parameter, information which specifies the diameters of different sections of the object of interest may be used.

The object of interest may be a lesion whose shape is changed with time.

A warning unit may be set which gives a warning when the determination unit determines that the change is equal to or greater than the preset amount of change.

A medical image measurement method of the present invention includes acquiring a first medical image and a second medical image obtained by photographing the same object of interest of the same patient at different time points; acquiring a first measurement parameter set for measuring the features of the shape of the object of interest in the first medical image and a second measurement parameter set for measuring the features of the shape of the object of interest in the second medical image; acquiring an evaluation value indicating a change between the first measurement parameter and the second measurement parameter; and determining whether or not the change is equal to or greater than a preset amount of change based on the evaluation value.

A non-transitory computer-readable recording medium has a medical image measurement program recorded thereon, the medical image measurement program causing a computer to function as: a medical image acquisition unit which acquires a first medical image and a second medical image obtained by photographing the same object of interest of the same patient at different time points; a measurement parameter acquisition unit which acquires a first measurement parameter set for measuring the features of the shape of the object of interest in the first medical image and a second measurement parameter set for measuring the features of the shape of the object of interest in the second medical image; an evaluation value acquisition unit which acquires an evaluation value indicating a change between the first measurement parameter and the second measurement parameter; and a determination unit which determines whether or not the change is equal to or greater than a preset amount of change based on the evaluation value.

According to the medical image measurement device and method and the non-transitory computer-readable recording medium having a program recorded thereon of the invention, the first medical image and the second medical image are acquired by photographing the same object of interest of the same patient at different time points, the first measurement parameter set for measuring the features of the shape of the object of interest in the first medical image and the second measurement parameter set for measuring the features of the shape of the object of interest in the second medical image are acquired, the evaluation value indicating a change between the first measurement parameter and the second measurement parameter is acquired, and it is determined whether or not the change is equal to or greater than a preset amount of change based on the evaluation value. Therefore, for example, when the change is equal to or greater than the preset amount of change, the measurement parameter is automatically reset, or a warning thereof is given and a user resets the measurement parameter, whereby it is possible to perform a more appropriate measurement.

DESCRIPTION OF THE PREFERRED EMBODIMENTS

Figure 1:
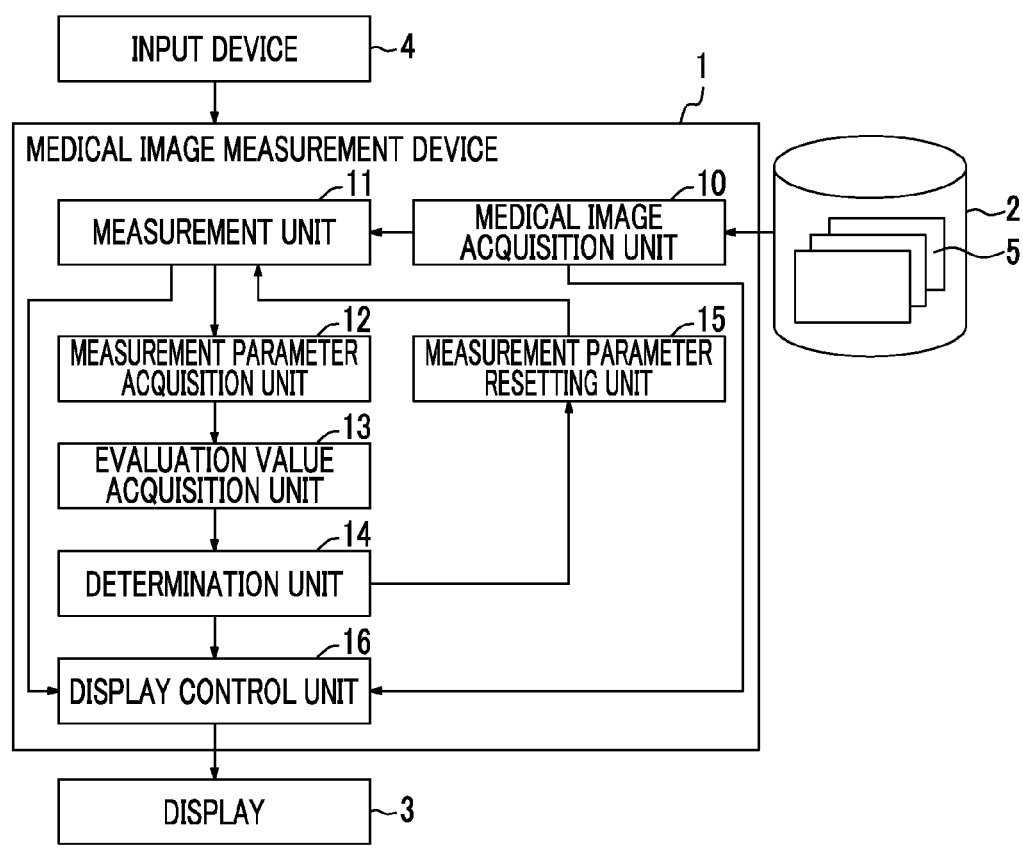
FIG. 1 is a block diagram showing the schematic configuration of a medical image diagnosis support system using an embodiment of a medical image measurement device and method and a program of the invention.

Hereinafter, a medical image diagnosis support system using an embodiment of a medical image measurement device and method and a program of the invention will be described in detail referring to the drawings. FIG. 1 is a block diagram showing the schematic configuration of the medical image diagnosis support system of this embodiment.

As shown in FIG. 1, the medical image diagnosis support system of this embodiment includes a medical image measurement device 1, a medical image storage server 2, a display 3, and an input device 4.

The medical image measurement device 1 has a medical image measurement program of this embodiment which is installed on a computer.

The medical image measurement device 1 includes a central processing unit (CPU), a semiconductor memory, and a storage device, such as a hard disk or a solid state drive (SSD). In the storage device, the medical image measurement program of this embodiment is installed, and the medical image measurement program is executed by the central processing unit, whereby a medical image acquisition unit 10, a measurement unit 11, a measurement parameter acquisition unit 12, an evaluation value acquisition unit 13, a determination unit 14, a measurement parameter resetting unit 15, and a display control unit 16 shown in FIG. 1 are operated.

The medical image acquisition unit 10 acquires medical images 5 of patients photographed in advance. The medical images 5 are, for example, tomographic images photographed by a computed tomography (CT) apparatus, a magnetic resonance imaging (MRI) apparatus, or the like, three-dimensional images having a plurality of tomographic images, or the like. The tomographic images are axial sectional images, sagittal sectional images, coronal sectional images, other multi-planar reconstruction (MPR) sectional images, or the like.

The medical images 5 are stored in the medical image storage server 2 in advance along with identification information of the patients. The medical image acquisition unit 10 reads, based on identification information of a patient input by a user using the input device 4, medical images 5 having the identification information from the medical image storage server 2. In particular, the medical image acquisition unit 10 of this embodiment acquires a first medical image and a second medical image obtained by photographing the same object of interest of the same patient at different time points. For example, the object of interest is, not limited to, a mass whose shape changes over time, a polyp, a cerebral aneurysm of a head, or the like, and may be other lesions. The object of interest is not limited to a lesion, and may be a specific bone, joint, or the like. The medical image acquisition unit 10 of this embodiment acquires a medical image photographed previously as the first medical image and acquires a medical image photographed most recently as the second medical image.

For example, the user may input file names using the input device 4 or may select thumbnail images or the like displayed on the display 3 to designate the first medical image and the second medical image.

For example, photographing region information, such as the head, chest, or abdomen, may be added to the medical images 5, and the medical image acquisition unit 10 may automatically read a first medical image and a second medical image having the photographing region information from the medical image storage server 2 based on photographing region information input by the user using the input device 4. Alternatively, lesion information, such as a mass, a polyp, or a cerebral aneurysm, may be added to the medical images 5, and a first medical image and a second medical image having the same lesion information may be read from the medical image storage server 2 based on lesion information input by the user using the input device 4. The invention is not limited to this method, and the first medical image and the second medical image may be automatically acquired using other known methods.

The measurement unit 11 receives the first medical image and the second medical image acquired by the medical image acquisition unit 10 as input, and measures the features of the shape of an object of interest included in each of the input first medical image and the second medical image.

Specifically, the measurement unit 11 of this embodiment acquires tomographic images as the first medical image and the second medical image, and measures, as information indicating the size of a lesion area of a mass in each of the tomographic images, the diameter of the lesion area.

The growth of the lesion or the reduction effect of the lesion by radiation therapy can be known by comparing the diameter of the lesion area included in the first medical image photographed previously with the diameter of the lesion area included in the second medical image photographed most recently.

The measurement parameter acquisition unit 12 acquires a first measurement parameter set for measuring the diameter of the lesion area of the first medical image and a second measurement parameter set for measuring the diameter of the lesion area of the second medical image in the measurement unit 11. Specifically, the measurement parameter acquisition unit 12 of this embodiment acquires the coordinates of two end points of the diameter of the lesion area of the first medical image as the first measurement parameter, and acquires the coordinates of the two end points of the diameter of the lesion area of the second medical image as the second measurement parameter. In this embodiment, although the coordinates of the two end points of the diameter are acquired as the first and second measurement parameters, the invention is not limited to the coordinates of the end points, and for example, vector information representing the diameter may be acquired as the first and second measurement parameters.

Figure 2:
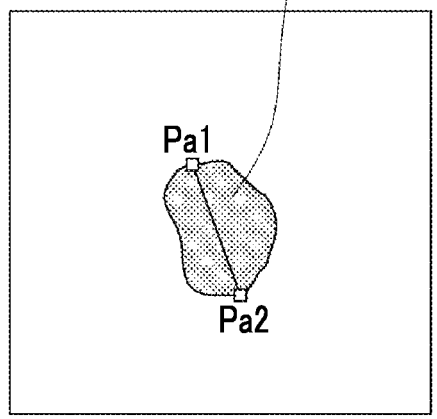
FIG. 2 is a diagram showing an example of a first medical image photographed previously and a second medical image photographed most recently.
Figure 2:
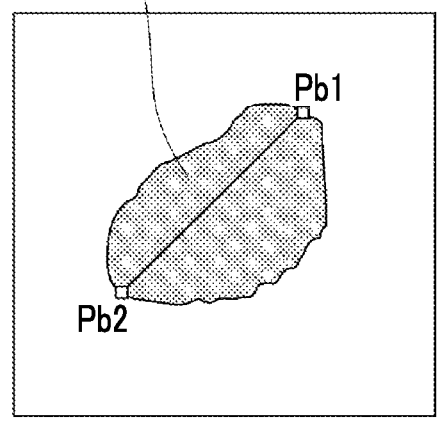

Hereinafter, the first measurement parameter and the second measurement parameter will be specifically described referring to FIG. 2. FIG. 2 shows an example of a first medical image and a second medical image including the same lesion area of different sizes.

As described above, first, in order to measure the diameter of the lesion area included in the first medical image, the end points (Pa1, Pa2) of the diameter are set. As a setting method of the end points of the diameter, for example, the user may designate the end points using the input device 4 on the first medical image displayed on the display 3, or the end points of a maximum diameter may be automatically specified based on a lesion area extracted automatically. As a method of automatically specifying the end points of the maximum diameter, known methods can be used.

In order to measure the diameter of the lesion area included in the second medical image, the end points (Pb1, Pb2) of the diameter are set. A setting method of the end points of the diameter is the same as that in the first medical image.

As described above, when confirming the growth or the like of the lesion area by measuring the diameter of the lesion area, in general, a diameter which is considered to be the maximum diameter of the lesion area is designated by the user or is automatically set. Meanwhile, as described above, an appropriate growth or reduction effect may not be confirmed when comparing the maximum diameters depending on the way of the change over time of the shape of the lesion.

Accordingly, in this embodiment, an evaluation value indicating a change between the first measurement parameter and the second measurement parameter set for measuring the diameters of the lesion area of the first medical image and the second medical image in the measurement unit 11 is acquired. The determination unit 14 determines whether or not the set first measurement parameter and second measurement parameter are appropriate for confirming the growth or reduction effect of the lesion based on the evaluation value.

The evaluation value acquisition unit 13 acquires the evaluation value indicating the change between the first measurement parameter and the second measurement parameter described above. Hereinafter, an acquisition method of the evaluation value in the evaluation value acquisition unit 13 of this embodiment will be described referring to FIG. 3.

Figure 3:
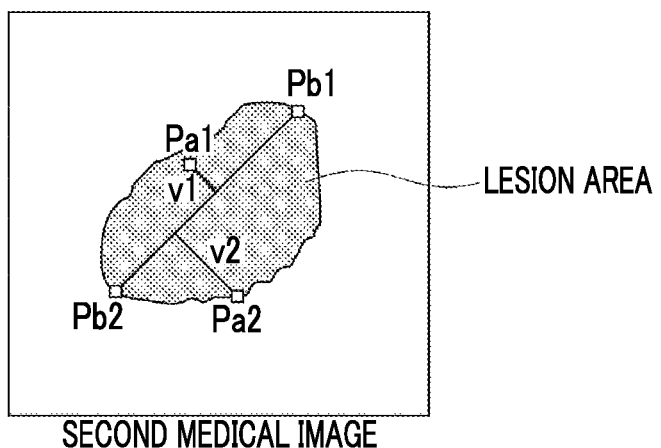
FIG. 3 is a diagram illustrating an example of an acquisition method of an evaluation value indicating a change between a first measurement parameter and a second measurement parameter.

Specifically, as shown in FIG. 3, the evaluation value acquisition unit 13 of this embodiment plots the coordinates of the end point Pa1 and the end point Pa2 set in the first medical image on the second medical image. The distance value v1 between a line, which passes through the end point Pb1 and the end point Pb2 set in the second medical image, and the end point Pa1 is calculated based on Expression (1), and the distance value v2 between the line and the end point Pa2 is calculated based on Expression (2). In Expressions (1) and (2), "x" is a symbol indicating a vector product. Next, an evaluation value V is calculated using Expressions (3) and (4) based on the distance value v1 and the distance value v2 calculated using Expressions (1) and (2). That is, when a value obtained by adding the distance value v1 and the distance value v2 is not zero, the evaluation value V is calculated using Expression (3), and when the value obtained by adding the distance value v1 and the distance value v2 is zero, the evaluation value V is calculated using Expression (4). In Expression (4), Vmin is a preset threshold value.

$$v1 = \frac{(Pa1 - Pb1) \times (Pa2 - Pb1)}{|Pb2 - Pb1|} \quad (1)$$

$$v2 = \frac{(Pa2 - Pb1) \times (Pb2 - Pb1)}{|Pb2 - Pb1|} \quad (2)$$

$$V = 1/[(v1 + v2)/|Pb2 - Pb1|] \quad \text{if } v1 + v2 \neq 0 \quad (3)$$

$$V = V\min + 1 \quad \text{else} \quad (4)$$

The determination unit 14 acquires the evaluation value V calculated in the above-described manner in the evaluation value acquisition unit 13, and determines whether or not the change between the first measurement parameter and the second measurement parameter is equal to or greater than a preset amount of change based on the evaluation value V.

Specifically, the determination unit 14 of this embodiment compares the evaluation value V with the preset threshold value Vmin, and when the evaluation value V is equal to or less than the threshold value Vmin, that is, when the end point Pa1 and the end point Pa2 as the first measurement parameter do not exist near the line passing through the end point Pb1 and the end point Pb2 as the second measurement parameter, determines that the change between the first measurement parameter and the second measurement parameter is equal to or greater than the preset amount of change.

The evaluation value V is compared with the threshold value Vmin, and when the evaluation value V is greater than the threshold value Vmin, that is, when the end point Pa1 and the end point Pa2 as the first measurement parameter exist near the line passing through the end point Pb1 and the end point Pb2 as the second measurement parameter, it is determined that the change between the first measurement parameter and the second measurement parameter is smaller than the preset amount of change.

When the determination unit 14 determines that the change between the first measurement parameter and the second measurement parameter is smaller than the preset amount of change, it is determined that the diameters of the lesion area respectively measured using the first measurement parameter and the second measurement parameter are appropriate for confirming the growth or reduction effect of the lesion area, and the diameters are output to the display control unit 16 and are displayed on the display 3 by the display control unit 16.

When the determination unit 14 determines that the change between the first measurement parameter and the second measurement parameter is equal to or greater than the preset amount of change, it is determines that the diameters of the lesion area respectively measured using the first measurement parameter and the second measurement parameter are inappropriate for confirming the growth or reduction effect of the lesion area, and the determination result is output to the measurement parameter resetting unit 15.

The measurement parameter resetting unit 15 acquires a third measurement parameter by resetting the first measurement parameter (end points Pa1, Pa2) set in the first medical image using the second measurement parameter (end points Pb1, Pb2) according to the input determination result.

Figure 4:
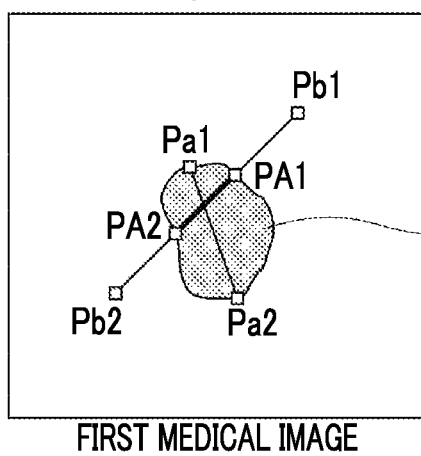
FIG. 4 is a diagram illustrating an example of an acquisition method of a third measurement parameter.

Specifically, as shown in FIG. 4, the measurement parameter resetting unit 15 of the embodiment first automatically extracts the lesion area included in the first medical image. As an extraction method of the lesion area, known methods can be used. Next, the end point Pb1 and the end point Pb2 of the diameter of the lesion area set in the second medical image are plotted on the first medical image, and the coordinates of a point on the contour of the lesion area on the first medical image among points on a line passing through the end point Pb1 and the end point Pb2 is acquired as the third measurement parameter. That is, the coordinates of a point PA1 and a point PA2 shown in FIG. 4 are acquired as the third measurement parameter.

The third measurement parameter reset in the measurement parameter resetting unit 15 is output to the measurement unit 11. The measurement unit 11 measures a diameter connecting the input point PA1 and point PA2 as information indicating the size of the lesion area of the first medical image, and outputs the measurement result to the display control unit 16. The display control unit 16 causes the display to display the measurement result re-measured in the measurement unit 11 as information indicating the size of the lesion area of the first medical image.

The display control unit 16 causes the display 3 to display the first and second medical images acquired by the medical image acquisition unit 10, the measurement results of the diameters of the lesion area included in the first and second medical images, or the like.

The input device 4 receives various setting inputs by the user, and is constituted by a keyboard, a mouse, or the like.

Figure 5:
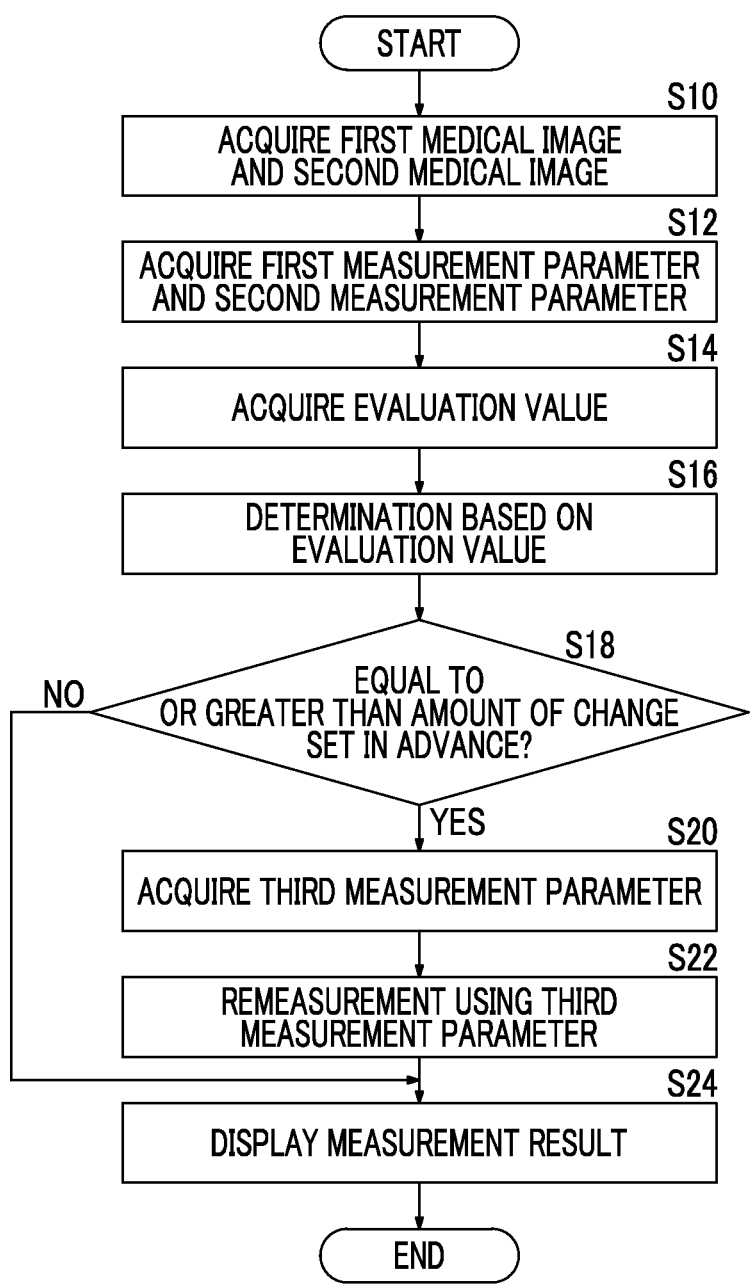
FIG. 5 is a flowchart illustrating the action of the medical image diagnosis support system using an embodiment of a medical image measurement device and method and a program of the invention.

Next, the action of the medical image measurement device of this embodiment will be described referring to a flowchart shown in FIG. 5.

First, the first medical image and the second medical image are read and acquired from the medical image storage server 2 by the medical image acquisition unit 10 based on an input of identification information or the like of a patient by the user (S10).

The first medical image and the second medical image acquired by the medical image acquisition unit 10 are output to the display control unit 16 and displayed on the display 3, and are output to the measurement unit 11. The first measurement parameter is set automatically or manually for the lesion area included in the first medical image, the second measurement parameter is set automatically or manually for the lesion area included in the second medical image, and the set first and second measurement parameters are acquired by the measurement parameter acquisition unit 12 (S12).

The first and second measurement parameters acquired by the measurement parameter acquisition unit 12 are output to the evaluation value acquisition unit 13, and the evaluation value acquisition unit 13 calculates the evaluation value V based on the input first and second measurement parameters (S14).

Next, the evaluation value V calculated by the evaluation value acquisition unit 13 is output to the determination unit 14, and the determination unit 14 determines whether or not the evaluation value V is equal to or less than the threshold value Vmin as described above, thereby determining whether or not the change between the first measurement parameter and the second measurement parameter is equal to or greater than the preset amount of change (S16).

When the determination unit 14 determines that the change between the first measurement parameter and the second measurement parameter is smaller than the preset amount of change (S18, NO), a measurement result of measuring the diameter of the lesion area of the first medical image using the first measurement parameter set in S12 and a measurement result of measuring the diameter of the lesion area of the second medical image using the second measurement parameter are output to the display control unit 16, and the measurement results are displayed on the display 3 (S24).

When the determination unit 14 determines that the change between the first measurement parameter and the second measurement parameter is equal to or greater than the preset amount of change (S18, YES), the determination result is output to the measurement parameter resetting unit 15, and the measurement parameter resetting unit 15 acquires the third measurement parameter in the above-described manner according to the input determination result (S20).

The third measurement parameter acquired by the measurement parameter resetting unit 15 is output to the measurement unit 11, and the measurement unit 11 measures the diameter of the lesion area of the first medical image using the third measurement parameter and outputs the measurement result to the display control unit 16 (S22).

The display control unit 16 causes the measurement result measured using third measurement parameter to be displayed for the lesion area of the first medical image and measurement result measured using the second measurement parameter to be displayed for the lesion area of the second medical image (S24).

According to the medical image diagnosis support system of the above-described embodiment, the evaluation value indicating the change between the first measurement parameter and the second measurement parameter is acquired, it is determined whether or not the change is equal to or greater than the preset amount of change based on the evaluation value, and when the change is equal to or greater than the preset amount of change, the third measurement parameter is automatically reset in consideration of a change over time of the object of interest. Therefore, it is possible to perform a more appropriate measurement.

The setting of the first measurement parameter and the measurement using the first measurement parameter, and the setting of the second measurement parameter and the measurement using the second measurement parameter may be performed when both the first medical image and the second medical image have been photographed. Alternatively, the setting of the first measurement parameter and the measurement using the first measurement parameter may be performed when the first medical image has been photographed, and thereafter, the setting of the second measurement parameter and the measurement using the second measurement parameter may be performed when the second medical image has been photographed.

In the medical image measurement device 1 of the above-described embodiment, although, as shown in FIG. 4, the end point Pb1 and the end point Pb2 of the diameter of the lesion area in the second medical image are plotted on the first medical image, and the coordinates of the point on the contour of the lesion area in the first medical image among the points on the line passing through the end point Pb1 and the end point Pb2 are acquired as the third measurement parameter, the method of acquiring the third measurement parameter is not limited to this method, and other methods may be used.

Specifically, for example, an image Ia of the lesion area in the first medical image and an image Ib of the lesion area in the second medical image may be extracted, non-rigid registration may be performed by the image Ia and the image Ib, and the end points PA1 and PA2 as the third measurement parameter may be acquired by Expression (5) using a thus-obtained image deformation amount W(P) (P is a position on an image).

$$PA1=Pb1+W(Pb1)$$
$$PA2=Pb2+W(Pb2) \quad (5)$$

In the above-described embodiment, the evaluation value is calculated based on the distance of the line, which passes through the end point Pb1 and the end point Pb2 as the second measurement parameter set in the second medical image, and the end point Pa1 and the end point Pa2 as the first measurement parameter. However, the evaluation value is not limited thereto, and for example, information on the angle between a line passing through the end point Pb1 and the end point Pb2 as the second measurement parameter and a line passing through the end point Pa1 and the end point Pa2 as the first measurement parameter may be calculated as the evaluation value. In this case, when information on the angle is greater, the amount of change between the first measurement parameter and the second measurement parameter is greater.

Figure 6:
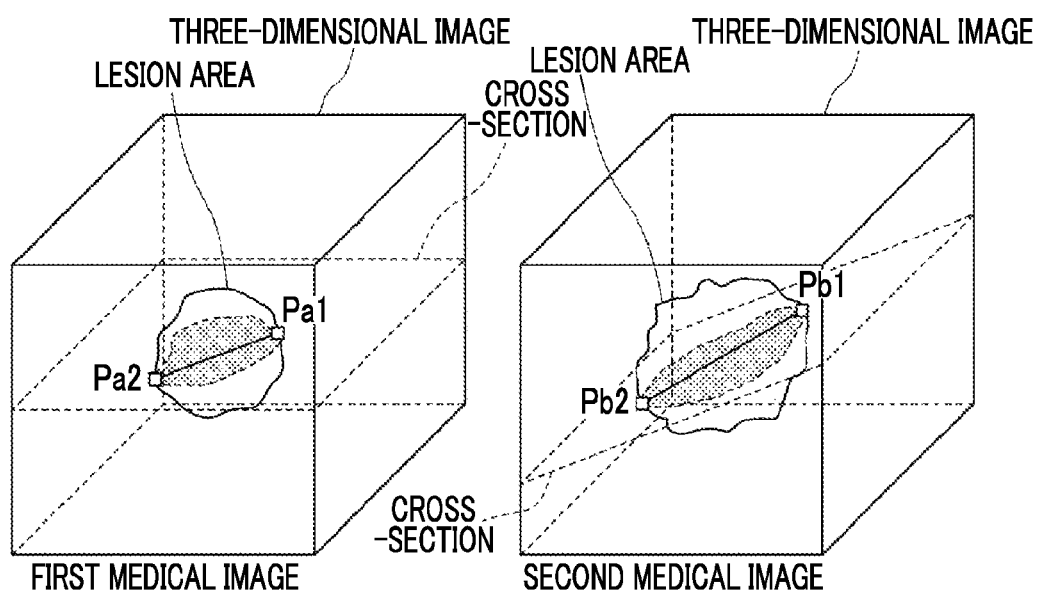
FIG. 6 is a diagram illustrating an example of a setting method of first and second measurement parameters for a lesion area in a three-dimensional image.

When both the first medical image and the second medical image acquired by the medical image measurement device 1 of the above-described embodiment are axial sectional images, it is desirable that the section positions of the images are the same. That is, it is desirable that the first measurement parameter (end points Pa1, Pa2) and the second measurement parameter (end points Pb1, Pb2) specify the diameter of the same section position in the lesion area. However, when three-dimensional images are acquired as the first medical image and the second medical image, as shown in FIG. 6, the first measurement parameter (end points Pa1, Pa2) set in the first medical image and the second measurement parameter (end points Pb1, Pb2) set in the second medical image may specify the diameters of different sections of the lesion area. In this case, as described above, the third measurement parameter may be acquired using the result of non-rigid registration of the image Ia of the lesion area in the first medical image and the image Ib of the lesion area in the second medical image. In regard to non-rigid registration, for example, known methods of David Mattes, David R. Haynor, Hubert Vesselle, Thomas K. Lewellen, and William Eubank, "Nonrigid multimodality image registration", Proceedings of the SPIE, volume 4322, p. 1609-1620, 2001, JP2011-41656A, and the like, may be used.

In the above-described embodiment, although the diameter of the lesion is measured, a measurement target may not necessarily be the diameter. For example, when a lesion is a polyp formed in the large intestine or the stomach, the height of the polyp from the surface of the large intestine may be measured.

Figure 7:
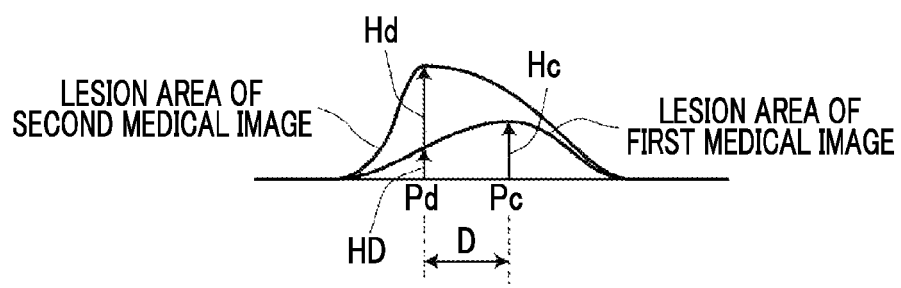
FIG. 7 is a diagram illustrating an example of measuring a height of a polyp.

In this case, as shown in FIG. 7, a measurement position Pc set for measuring a height Hc of a polyp existing in the first medical image photographed previously may be acquired as a first measurement parameter, a measurement position Pd set for measuring a height Hd of the polyp in the second medical image photographed at this time may be acquired as a second measurement parameter, and the distance D between the measurement position Pc and the measurement position Pd may be acquired as an evaluation value.

When the evaluation value is equal to or greater than a preset threshold value, it is determined that a change between the measurement parameters is equal to or greater than a preset amount of change. In this case, the measurement position Pc as the first measurement parameter set in the first medical image may be reset at the same position as the measurement position Pd as the second measurement parameter set in the second medical image and set as a third measurement parameter, and the height HD of the polyp of the first medical image at the measurement position Pd may be re-measured. In the above description, the height of the polyp refers to a height at the highest position from the surface of the large intestine.

Figure 8:
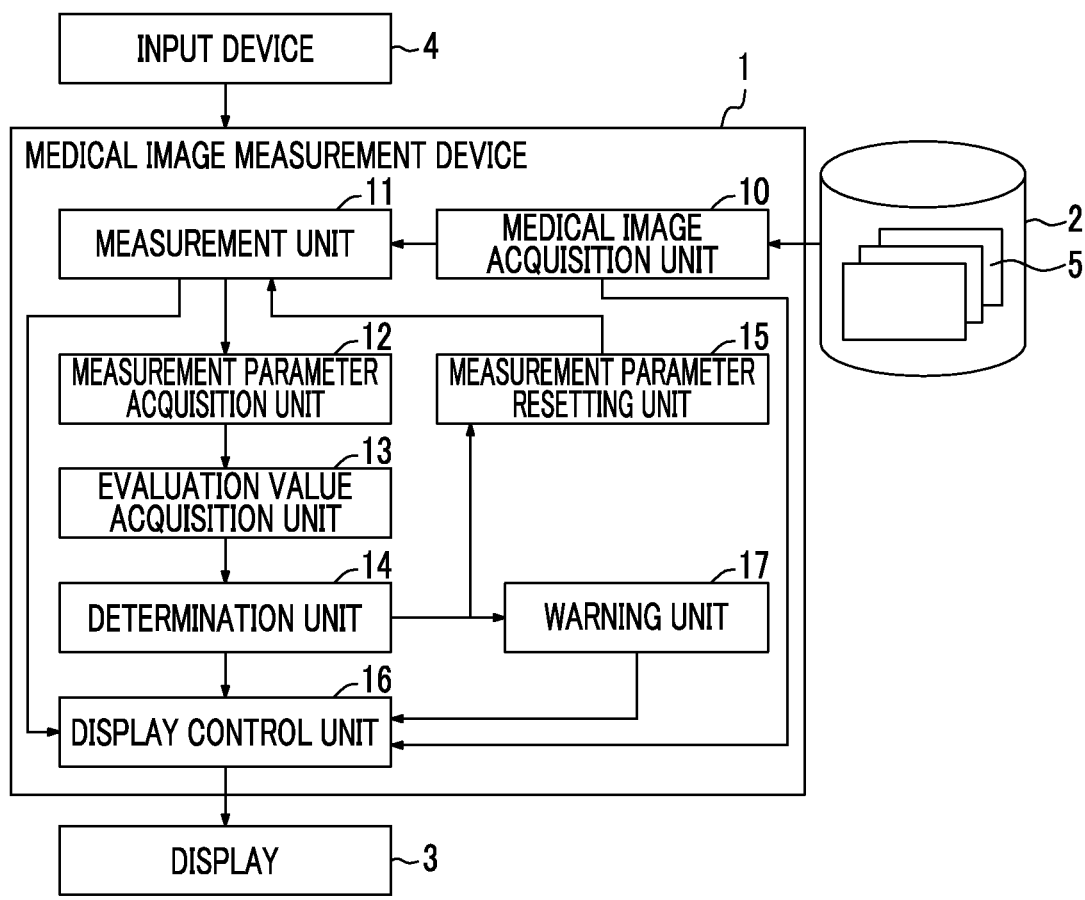
FIG. 8 is a block diagram showing the schematic configuration of a medical image diagnosis support system using another embodiment of a medical image measurement device and method and a program of the invention.

In the above-described embodiment, although it is determined whether or not the change between the first measurement parameter and the second measurement parameter is equal to or greater than the preset amount of change based on the evaluation value, and when the change is equal to or greater than the preset amount of change, the third measurement parameter is reset, as shown in FIG. 8, a warning unit 17 may be further provided, and when the change is equal to or greater than the preset amount of change, a message may be displayed to the user by the display control unit 16, or warning sound may be generated to give a warning. When the change is equal to or greater than the preset amount of change, only a warning may be given without resetting the third measurement parameter. The user can reset the measurement parameter by receiving the warning.

In the above-described embodiment, although the second measurement parameter (Pb1, Pb2) is plotted on the first medical image, and the first measurement parameter (Pa1, Pa2) is reset using the second measurement parameter (Pb1, Pb2) to acquire the third measurement parameter (PA1, PA2), the relationship of the first measurement parameter and the second measurement parameter may be reversed. That is, the first measurement parameter (Pa1, Pa2) may be plotted on the second medical image, and the second measurement parameter (Pb1, Pb2) may be reset using the first measurement parameter (Pa1, Pa2) to acquire a third measurement parameter (PB1, PB2). As the acquisition method of the third measurement parameter, the acquisition method of above-described embodiment can be used, and for example, the coordinates of a point on the contour of the lesion area in the second medical image among points on a line passing through the end point Pa1 and the end point Pa2 plotted on the second medical image can be acquired as the third measurement parameter (PB1, PB2). As described above, the result of non-rigid registration may be used.

In the above-described embodiment, although the diameter of the lesion included in the medical image is measured, as described above, the measurement target is not limited to the lesion, and may be a bone or a joint included in the medical image. That is, two anatomical feature points of the bone or joint in the first medical image may be set as a first measurement parameter, the two anatomical feature points in the second medical image may be set as a second measurement parameter, and as in the above-described embodiment, when a change between the first measurement parameter and the second measurement parameter is equal to or greater than a preset amount of change, a third measurement parameter may be set or a warning may be given.

What is claimed is:

1. A medical image measurement device comprising:
   a processor configured to perform:
   acquiring a first medical image and a second medical image obtained by photographing the same object of interest of the same patient at different time points,
   acquiring a first measurement parameter set for measuring the features of the shape of the object of interest in the first medical image and a second measurement parameter set for measuring the features of the shape of the object of interest in the second medical image,
   acquiring an evaluation value indicating a change between the first measurement parameter and the second measurement parameter,
   determining whether or not the change is equal to or greater than a preset amount of change based on the evaluation value, and
   the processor is further configured to perform, when the processor determines that the change is equal to or greater than a preset amount of change, resetting one measurement parameter of the first measurement parameter and the second measurement parameter using the other measurement parameter to acquire a third measurement parameter, and
   using the third measurement parameter, measuring the features of the shape of the object of interest in the first medical image or the second medical image with the one measurement parameter set.

2. The medical image measurement device according to claim 1,
   wherein the processor is configured to perform acquiring the third measurement parameter based on a result of non-rigid registration of an image of the object of interest in the first medical image and an image of the object of interest in the second medical image and the other measurement parameter.

3. The medical image measurement device according to claim 1,
   wherein the first measurement parameter, the second measurement parameter, and the third measurement parameter are information which specifies the diameter of the object of interest to be measured.

4. The medical image measurement device according to claim 2,
   wherein the first measurement parameter, the second measurement parameter, and the third measurement parameter are information which specifies the diameter of the object of interest to be measured.

5. The medical image measurement device according to claim 1,
   wherein the first measurement parameter, the second measurement parameter, and the third measurement parameter are the coordinates of two points which are used to measure the distance between the two points in the object of interest.

6. The medical image measurement device according to claim 2,
   wherein the first measurement parameter, the second measurement parameter, and the third measurement parameter are the coordinates of two points which are used to measure the distance between the two points in the object of interest.

7. The medical image measurement device according to claim 3,
   wherein the first measurement parameter, the second measurement parameter, and the third measurement parameter are the coordinates of two points which are used to measure the distance between the two points in the object of interest.

8. The medical image measurement device according to claim 5,
   wherein the processor is configured to perform acquiring, as the third measurement parameter, the coordinates of an intersection point of a line connecting the coordinates of two points as the other measurement parameter and the contour of the object of interest in the first medical image or the second medical image with the one measurement parameter set.

9. The medical image measurement device according to claim 6,
wherein the processor is configured to perform acquiring, as the third measurement parameter, the coordinates of an intersection point of a line connecting the coordinates of two points as the other measurement parameter and the contour of the object of interest in the first medical image or the second medical image with the one measurement parameter set.

10. The medical image measurement device according to claim 7,
wherein the processor is configured to perform acquiring, as the third measurement parameter, the coordinates of an intersection point of a line connecting the coordinates of two points as the other measurement parameter and the contour of the object of interest in the first medical image or the second medical image with the one measurement parameter set.

11. The medical image measurement device according to claim 4,
wherein the processor is configured to perform acquiring the evaluation value based on the distance between a line connecting the coordinates of two points as the other measurement parameter and each of the coordinates of two points as the one measurement parameter.

12. The medical image measurement device according to claim 8,
wherein the processor is configured to perform acquiring the evaluation value based on the distance between a line connecting the coordinates of two points as the other measurement parameter and each of the coordinates of two points as the one measurement parameter.

13. The medical image measurement device according to claim 4,
wherein the processor is configured to perform acquiring, as the evaluation value, information on the angle between a line connecting the coordinates of two points as the first measurement parameter and a line connecting the coordinates of two points as the second measurement parameter.

14. The medical image measurement device according to claim 8,
wherein the processor is configured to perform acquiring, as the evaluation value, information on the angle between a line connecting the coordinates of two points as the first measurement parameter and a line connecting the coordinates of two points as the second measurement parameter.

15. The medical image measurement device according to claim 3,
wherein the first medical image and the second medical image are three-dimensional images, and the first measurement parameter, the second measurement parameter, and the third measurement parameter are information which specifies the diameters of different sections of the object of interest.

16. The medical image measurement device according to claim 1,
wherein the object of interest is a lesion whose shape changes over time.

17. The medical image measurement device according to claim 1, further comprising:
a warning unit which gives a warning when the determination unit determines that the change is equal to or greater than the preset amount of change.

18. A medical image measurement method comprising:
acquiring a first medical image and a second medical image obtained by photographing the same object of interest of the same patient at different time points;
acquiring a first measurement parameter set for measuring the features of the shape of the object of interest in the first medical image and a second measurement parameter set for measuring the features of the shape of the object of interest in the second medical image;
acquiring an evaluation value indicating a change between the first measurement parameter and the second measurement parameter;
determining whether or not the change is equal to or greater than a preset amount of change based on the evaluation value;
wherein when the change is determined to be equal to or greater than a preset amount of change, said method further comprises resetting one measurement parameter of the first measurement parameter and the second measurement parameter using the other measurement parameter to acquire a third measurement parameter; and
using the third measurement parameter, measuring the features of the shape of the object of interest in the first medical image or the second medical image with the one measurement parameter set.

19. A non-transitory computer-readable recording medium having a medical image measurement program recorded thereon, the medical image measurement program causing a computer to function as:
a medical image acquisition unit which acquires a first medical image and a second medical image obtained by photographing the same object of interest of the same patient at different time points;
a measurement parameter acquisition unit which acquires a first measurement parameter set for measuring the features of the shape of the object of interest in the first medical image and a second measurement parameter set for measuring the features of the shape of the object of interest in the second medical image;
an evaluation value acquisition unit which acquires an evaluation value indicating a change between the first measurement parameter and the second measurement parameter;
a determination unit which determines whether or not the change is equal to or greater than a preset amount of change based on the evaluation value;
a measurement parameter resetting unit which, when the determination unit determines that the change is equal to or greater than a preset amount of change, resets one measurement parameter of the first measurement parameter and the second measurement parameter using the other measurement parameter to acquire a third measurement parameter; and
a measurement unit which, using the third measurement parameter, measures the features of the shape of the object of interest in the first medical image or the second medical image with the one measurement parameter set.

* * * * *